US012114218B2

(12) United States Patent
Johansson et al.

(10) Patent No.: US 12,114,218 B2
(45) Date of Patent: Oct. 8, 2024

(54) USE OF SYSTEM RESPONSE TIME FOR CELL OR BEAM (RE)SELECTION

(71) Applicant: Telefonaktiebolaget LM Ericsson (publ), Stockholm (SE)

(72) Inventors: Nicklas Johansson, Linköping (SE); John Walter Diachina, Garner, NC (US); Jonas Fröberg Olsson, Ljungsbro, LA (US); Walter Müller, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 387 days.

(21) Appl. No.: 17/610,302

(22) PCT Filed: Apr. 30, 2020

(86) PCT No.: PCT/SE2020/050434
§ 371 (c)(1),
(2) Date: Nov. 10, 2021

(87) PCT Pub. No.: WO2020/231310
PCT Pub. Date: Nov. 19, 2020

(65) Prior Publication Data
US 2022/0400420 A1    Dec. 15, 2022

Related U.S. Application Data

(60) Provisional application No. 62/846,293, filed on May 10, 2019.

(51) Int. Cl.
*H04W 36/08* (2009.01)
*H04B 7/08* (2006.01)

(52) U.S. Cl.
CPC ............ *H04W 36/08* (2013.01); *H04B 7/088* (2013.01)

(58) Field of Classification Search
None
See application file for complete search history.

(56) References Cited

U.S. PATENT DOCUMENTS 9,288,748 B2 * 3/2016 Chin ..................... H04W 48/18
10,904,811 B2 * 1/2021 Fujishiro ............... H04W 48/20
(Continued)

FOREIGN PATENT DOCUMENTS

| CN | 103385023 A | 11/2013 |
| CN | 106612526 A | 5/2017 |
| JP | 2004080228 A | 3/2004 |

OTHER PUBLICATIONS

Examination Report for European Patent Application No. 20725254. 5, mailed Aug. 30, 2023, 9 pages.
(Continued)

*Primary Examiner* — Phuoc H Nguyen
(74) *Attorney, Agent, or Firm* — Withrow & Terranova, PLLC

(57) ABSTRACT

Systems and methods for using response times of one or more Radio Access Network (RAN) nodes for cell or beam selection or reselection are disclosed herein. In one embodiment, a method performed by a User Equipment (UE) for cell or beam selection or reselection in a cellular communications system comprises receiving response times from one or more RAN nodes. The method further comprises performing a cell or beam selection or reselection procedure that takes into consideration the response times received from the one or more RAN nodes. Corresponding embodiments of a UE are also disclosed. Embodiments of a method performed by a RAN node and corresponding embodiments of a RAN node are also disclosed.

18 Claims, 10 Drawing Sheets

(56) References Cited

U.S. PATENT DOCUMENTS

| | | | |
|---|---|---|---|
| 2004/0266474 A1 | 12/2004 | Petrus | |
| 2010/0128617 A1 | 5/2010 | Aggarwal et al. | |
| 2014/0369280 A1* | 12/2014 | Diachina | H04W 52/0229 370/329 |
| 2015/0139183 A1* | 5/2015 | Pradas | H04W 74/0833 370/331 |
| 2016/0302118 A1* | 10/2016 | Yiu | H04W 36/22 |
| 2018/0199385 A1* | 7/2018 | Ramkull | H04W 36/0094 |
| 2019/0052338 A1* | 2/2019 | Nader | H04B 7/0695 |
| 2022/0030657 A1* | 1/2022 | Yamine | H04W 24/04 |

OTHER PUBLICATIONS

Author Unknown, "Technical Specification Group Services and System Aspects; Service requirements for the 5G system; Stage 1 (Release 16)," Technical Specification 22.261, Version 16.7.0, Mar. 2019, 3GPP Organizational Partners, 72 pages.
Author Unknown, "Technical Specification Group Services and System Aspects; System architecture for the 5G System (5GS); Stage 2 (Release 15)," Technical Specification 23.501, Version 15.8.0, Dec. 2019, 3GPP Organizational Partners, 248 pages.
Author Unknown, "Technical Specification Group Radio Access Network; NR; NR and NG-RAN Overall Description; Stage 2 (Release 15)," Technical Specification 38.300, Version 15.8.0, Dec. 2019, 3GPP Organizational Partners, 99 pages.
Author Unknown, "Technical Specification Group Radio Access Network; NR; Radio Resource Control (RRC) protocol specification (Release 15), " Technical Specification 38.331, Version 15.5.1, Apr. 2019, 3GPP Organizational Partners, 491 pages.
Author Unknown, "5G; NG-RAN; E1 Application Protocol (E1AP)," Technical Specification 138.463, Version 15.6.0, Jan. 2020, ETSI, 179 pages.
Author Unknown, "5G; NG-RAN; F1 Application Protocol (F1AP)," Technical Specification 138.473, Version 15.8.0, Jan. 2020, ETSI, 224 pages.
Khan, Murad, et al., "An Optimized Network Selection and Handover Triggering Scheme for Heterogeneous Self Organized Wireless Networks," Mathematical Problems in Engineering, vol. 2014, Hindawi Publishing Corporation, Apr. 2014, 11 pages.
International Search Report and Written Opinion for International Patent Application No. PCT/SE2020/050434, mailed Jul. 6, 2020, 13 pages.
International Preliminary Report on Patentability for International Patent Application No. PCT/SE2020/050434, mailed Aug. 19, 2021, 10 pages.
First Office Action for Chinese Patent Application No. 202080034560. 2, mailed Nov. 8, 2023, 8 pages.
International Preliminary Report on Patentability for International Patent Application No. PCT/SE2020/050434, mailed Nov. 29, 2021, 21 pages.

* cited by examiner

*Split gNB architecture*

*Illustration of time-frequency allocation for two periodic traffic streams*

USE OF SYSTEM RESPONSE TIME FOR CELL OR BEAM (RE)SELECTION

RELATED APPLICATIONS

This application is a 35 U.S.C. § 371 national phase filing of International Application No. PCT/SE2020/050434, filed Apr. 30, 2020, which claims the benefit of provisional patent application Ser. No. 62/846,293, filed May 10, 2019, the disclosures of which are hereby incorporated herein by reference in their entireties.

TECHNICAL FIELD

The present disclosure relates to cell or beam selection or reselection in a cellular communications system.

BACKGROUND

The 5th Generation (5G) System (5GS) is planned to be introduced in the early 2020s and is envisioned to address new services and use cases. These new services are not only for human interaction, but also a huge growth in Machine Type Communications (MTC) driven by, e.g., factory automation and flexible process control. Ultra-Reliable and Low Latency Communication (URLLC) is one important enabler to support these new services.

The most stringent requirement on URLLC currently being studied in the Third Generation Partnership Project (3GPP) Radio Access Network (RAN) Work Group (WG) is 99.999%-99.9999999% reliability under the radio latency bound of 1 millisecond (ms) (see 3GPP Technical Specification (TS) 22.261 V16.7.0). The maximum packet error rate must not be higher than $10^{-5}$-$10^{-9}$, where maximum allowable radio latency, including retransmissions, is down to 1 ms. With the new numerology consideration for 5G New Radio (NR), for example 0.125 ms slot Transmission Time Interval (TTI) size or even shorter mini-slot based TTIs where each TTI contains both control and data information, there is a possibility to support Uplink (UL) Grant-Free (GF) transmissions with 1 ms latency.

Cell reselection is a mechanism to ensure that a User Equipment (UE) is camping on the best cell. The UE does not change cells randomly; rather, it uses a set of criteria and algorithms for the reselection process. Without going into details, the criteria that the UE uses when reselecting to a new cell are related to the absolute priority, the radio link quality, and the cell accessibility.

In Long Term Evolution (LTE), a UE in RRC_IDLE state measures the Reference Signal Received Power (RSRP) and Reference Signal Received Quality (RSRQ) level of cells and evaluates the cell selection criterion and cell reselection criterion based on these measurements. The UE will select a suitable cell which needs to fulfill several requirements including fulfilling the cell selection criterion, S, to camp on a cell to obtain normal service. After camping on a cell, the UE still measures and evaluates the serving cell and non-serving cells. When the UE switches from camping on one cell to camping on another cell, this is known as cell reselection.

In LTE, the cell reselection procedure allows a camped UE to reselect a more suitable cell and camp on it. In that process, cell reselection between frequencies and Radio Access Technologies (RATs) is mainly based on absolute priorities. The UE initially evaluates the frequencies of all RATs it supports based on the RAT priorities and then compares the cells on the relevant frequencies based on radio conditions, using a ranking criterion before reselecting to the target cell (also depending on its accessibility). The UE ranks the intra-frequency band cells and the cells on other frequency bands having equal priority which fulfill the S-criterion, as discussed above, using the so-called R-criterion, defined as follows:

For the serving cell, $R_s = Q_{meas,s} + Q_{Hyst} - Q\text{offset}_{temp}$

For neighbor cells, $R_n = Q_{meas,n} - Q\text{offset} - Q\text{offset}_{temp}$ where $Q_{meas}$ is the RSRP measurement quantity used in candidate cell evaluations, $Q_{Hyst}$ controls the degree of hysteresis for the ranking, and Qoffset is an offset applicable between serving and neighboring cells on frequencies of equal priority (the sum of the cell-specific and frequency-specific offsets). Meanwhile, $Q\text{offset}_{temp}$ is an offset temporarily applied to a cell.

In principle, the same cell reselection ranking procedure is agreed for NR as well. However, the only difference is that the parameter $Q\text{offset}_{temp}$ is not supported in NR, as of the agreements until the RAN2 #101 meeting in Athens.

NR supports a split RAN architecture. In this regard, 3GPP RAN WG3 has also specified new open interfaces between the Central Unit (CU) and the Distributed Units (DUs) of the NR base station (gNB) as well as between the Control Plane (CP) and the User Plane (UP) parts of the CU. The open interfaces between the CP part of the CU (CU-CP) and the DUs is named F1-C, while the open interfaces between the UP part of the CU (CU-UP) and the DUs is named F1-U. The open interface between CU-CP and CU-UP is named E1. The split gNB architecture is shown in FIG. 1.

The F1 Application Protocol (F1AP) is defined in 3GPP TS 38.473 (see, e.g., 3PGG TS 38.473 V15.5.0) and the E1 Application Protocol (E1AP) is defined in 3GPP TS 38.463 (see, e.g., 3GPP TS 38.463 V15.3.0). The E1AP defines the messages that are exchanged between the CU-CP and the CU-UP for the sake of providing UP services to the UE.

There currently exist certain challenge(s). UP payloads experience a delay as they migrate between a UE and the UP Function (UPF) in 5G systems, wherein this delay can be subject to strict limitations imposed by the Quality of Service (QoS) to be realized when sending that UP payload. This delay is known as the Packet Delay Budget (PDB) and has both a radio interface delay component and a fixed network delay component. One element of the fixed network delay component is the delay experienced as an UP payload migrates through the gNB. There is a need for systems and methods for meeting the strict limitations on delay, particularly in a 5G system.

SUMMARY

Systems and methods for using response times of one or more Radio Access Network (RAN) nodes for cell or beam selection or reselection are disclosed herein. In one embodiment, a method performed by a User Equipment (UE) for cell or beam selection or reselection in a cellular communications system comprises receiving response times from one or more RAN nodes. The method further comprises performing a cell or beam selection or reselection procedure that takes into consideration the response times received from the one or more RAN nodes. By taking the response times of the RAN node(s) into account for cell or beam selection or reselection, higher reliability in meeting targeted application latency requirements is provided.

In one embodiment, each of the response times reflect a current processing load of a respective one of the one or more RAN nodes.

In one embodiment, each of the response times reflect a current processing load of a respective one of the one or more RAN nodes that corresponds to a respective cell or beam under evaluation by the cell or beam selection or reselection procedure.

In one embodiment, the response times comprise two or more response times for two or more respective cells or beams detected by the UE, and performing the cell or beam selection or reselection procedure comprises selecting one of the two or more cells or beams based on the two or more response times for the two or more cells or beams.

In one embodiment, the two or more response times comprise different response times for uplink and downlink.

In one embodiment, receiving the response times comprises receiving the response times via one or more broadcast messages. In another embodiment, receiving the response times comprises receiving the response times via dedicated signaling.

In one embodiment, the UE is in an idle mode. In another embodiment, the UE is in an inactive mode.

In one embodiment, the cell or beam selection or reselection procedure is an intra-frequency cell or beam selection or reselection procedure. In another embodiment, the cell or beam selection or reselection procedure is an inter-frequency cell or beam selection or reselection procedure.

In one embodiment, the method further comprises receiving, from the one or more RAN nodes, one or more cell or beam selection or reselection constraints, wherein the cell or beam selection or reselection procedure takes into consideration the response times and the one or more cell or beam selection or reselection constraints. In one embodiment, the one or more cell or beam selection or reselection constraints comprise a radio link quality difference threshold with respect to a radio link quality of a defined reference cell or beam. In one embodiment, the one or more cell or beam selection or reselection constraints comprise: (a) a radio link quality constraint, (b) a maximum packet error rate constraint, (c) a maximum packet size constraint, (d) a time occasions related constraint, or (e) combination of any two or more of (a)-(d).

In one embodiment, at least one of the response times is indicated on a cell level. In one embodiment, at least one of the response times is indicated on a beam level. In one embodiment, at least one of the response times is indicated on a network slice level. In one embodiment, at least one of the response times is indicated on a Quality of Service (QoS) indicator level. In one embodiment, at least one of the response times is indicated on a Public Land Mobile Network (PLMN) level.

In one embodiment, the response times take into account delays and loads on interfaces northbound, in terms of network topology, from the one or more RAN nodes.

Corresponding embodiments of a UE are also disclosed. In one embodiment, a UE for cell or beam selection or reselection in a cellular communications system is adapted to receive response times from one or more RAN nodes and perform a cell or beam selection or reselection procedure that takes into consideration the response times received from the one or more RAN nodes.

In one embodiment, a UE for cell or beam selection or reselection in a cellular communications system comprises one or more receivers and processing circuitry associated with the one or more receivers. The processing circuitry is configured to cause the UE to receive response times from one or more RAN nodes and perform a cell or beam selection or reselection procedure that takes into consideration the response times received from the one or more RAN nodes.

Embodiments of a method performed by a RAN node are also disclosed. In one embodiment, a method performed by a RAN node in a cellular communications system comprises transmitting one or more response times associated with the RAN node, one or more cells served by the RAN node, or one or more beams served by the RAN node.

In one embodiment, each of the one or more response times reflect a current processing load of the RAN node.

In one embodiment, each of the one or more response times reflect a current processing load of the RAN node that corresponds to a respective cell or beam served by the RAN node.

In one embodiment, the one or more response times comprise two or more response times for two or more respective cells or beams served by the RAN node.

In one embodiment, the one or more response times comprise different response times for uplink and downlink.

In one embodiment, transmitting the one or more response times comprises transmitting the one or more response times via one or more broadcast messages. In another embodiment, transmitting the one or more response times comprises transmitting the one or more response times to a UE via dedicated signaling.

In one embodiment, the one or more response times are applicable to UE idle mode cell or beam selection or reselection. In another embodiment, the one or more response times are applicable to UE inactive mode cell or beam selection or reselection.

In one embodiment, the one or more response times are applicable to intra-frequency cell or beam selection or reselection. In another embodiment, the one or more response times are applicable to inter-frequency cell or beam selection or reselection.

In one embodiment, the method further comprises transmitting one or more cell or beam selection or reselection constraints. In one embodiment, the one or more cell or beam selection or reselection constraints comprise a radio link quality threshold difference with respect to a radio link quality of a defined reference cell. In one embodiment, the one or more cell or beam selection or reselection constraints comprise: (a) a radio link quality constraint, (b) a maximum packet error rate constraint, (c) a maximum packet size constraint, (d) a time occasions related constraint, or (e) a combination of any two or more of (a)-(d).

In one embodiment, at least one of the response times is indicated on a cell level. In one embodiment, at least one of the response times is indicated on a beam level. In one embodiment, at least one of the response times is indicated on a network slice level. In one embodiment, at least one of the response times is indicated on a QoS indicator level. In one embodiment, at least one of the response times is indicated on a PLMN level.

In one embodiment, the one or more response times take into account delays and loads on interfaces northbound, in terms of network topology, from the RAN node.

In one embodiment, the RAN node comprises one or more Distributed Units (DUs) and a Central Unit (CU). In one embodiment, the one or more DUs report load to the CU, wherein the CU determines the one or more response times based on the reported loads from the one or more DUs.

In one embodiment, the RAN node comprises one or more DUs and a Central Unit Control Plane (CU-CP). In one embodiment, the one or more DUs report load to the CU-CP, wherein the CU-CP determines the one or more response times based on the reported loads from the one or more DUs.

Corresponding embodiments of a RAN node are also disclosed. In one embodiment, a RAN node for a cellular communications system is adapted to transmit one or more response times associated with the RAN node, one or more cells served by the RAN node, or one or more beams served by the RAN node.

In one embodiment, a RAN node for a cellular communications system comprises a network interface and processing circuitry associated with the network interface. The processing circuitry is configured to cause the RAN node to transmit one or more response times associated with the RAN node, one or more cells served by the RAN node, or one or more beams served by the RAN node.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
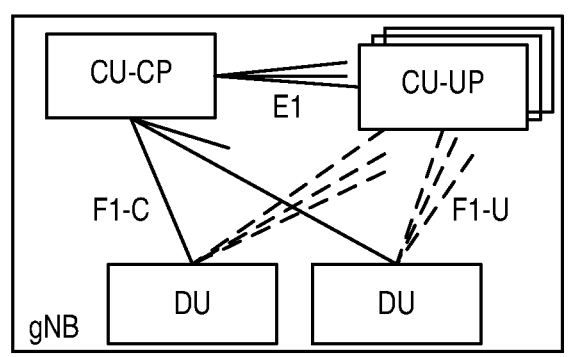
FIG. 1 illustrates the split New Radio (NR) base station (gNB) architecture.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" or "RAN node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane (UP) Function (UPF), a Session Management Function (SMF), an Authentication Server Function (AUSF), a Network Slice Selection Function (NSSF), a Network Exposure Function (NEF), a Network Repository Function (NRF), a Policy Control Function (PCF), a Unified Data Management (UDM), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment (UE) in a 3GPP network and a Machine Type Communication (MTC) device.

Network Node: As used herein, a "network node" is any node that is either part of the RAN or the core network of a cellular communications network/system.

Response Time: In the embodiments below, response time should be understood to mean an agreed response time value corresponding, e.g., to the average response time, an estimated worst-case response time, a predicted response time, or some other agreed way of calculating the response time. There are furthermore various examples of response time. In one example, the response time is the time it takes to receive the Random Access Response (RAR) message after transmitting a Scheduling Request (SR). In some other examples, the response time is the time it takes to transmit X bytes payload in Downlink (DL) and Y bytes payload in Uplink (UL) at a certain Reference Signal Received Power (RSRP) level from Radio Resource Control (RRC) idle state and where X and Y bytes are agreed, specified, or broadcasted values. In some other examples, the response time is the time it takes to transmit X bytes payload in DL and Y bytes payload in UL at a certain RSRP level from RRC Inactive state.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

In general, the embodiments described below are exemplified using NR but are applicable to other Radio Access Technologies (RATs) as well such as LTE, Global System for Mobile Communications (GSM), or any other wireless network where there are requirements on the latency.

There currently exist certain challenge(s) related to cell reselection in a cellular communications system such as the 5G System (5GS). UP payloads experience a delay as they migrate between a UE and the UPF in 5G systems, wherein this delay can be subject to strict limitations imposed by the Quality of Service (QoS) to be realized when sending that UP payload. This delay is known as the Packet Delay Budget (PDB) and has both a radio interface delay component and a fixed network delay component. One element of the fixed network delay component is the delay experienced as an UP payload migrates through the gNB. The problem with the current solution is that the UE is not aware of the cell load within the gNB associated with any given candidate cell (i.e., a cell being evaluated for suitability) during the cell reselection process. In some cases, this can imply that the targeted latency requirement cannot be met due to the loading experienced by a gNB associated with a cell identified as suitable using current cell reselection criterion. In a completely split RAN architecture, the cell load will depend on the load in the Distributed Unit (DU), the load in the Control Plane (CP) part of the Central Unit (CU) (i.e., the CU-CP), and the UP part of the CU (i.e., the CU-UP). Note that a similar concern exists for the UPF as its loading can increase to the point where it imposes a delay that, when combined with all other sources of delay between the UPF and UE, threatens the ability to realize the target PDB.

Certain aspects of the present disclosure and their embodiments may provide solutions to the aforementioned or other challenges. In some embodiments, a modification to the cell reselection process is introduced wherein the RAN nodes (i.e., gNBs in a 5GS) broadcast response time as a value reflecting the current gNB processing load (e.g., response time is the delay imposed as UP payload migrates through a gNB associated with a cell under evaluation for suitability) and wherein the UE takes the response time into account in the reselection process. The response time may, e.g., be the worst case or average estimated response time. In some embodiments, the RAN nodes further broadcast other configuration parameters such as, e.g., a radio link quality difference threshold below which the UE ranks cells according to the response time. The radio link quality difference threshold is a threshold for the difference between the quality of the serving cell and that of a cell being evaluated for suitability for cell reselection. In some embodiments, the response time may also take the estimated transport across interfaces or processing delay in other nodes (e.g., the UPF) into account. In one embodiment, the response time includes UP payload delays from the radio interface side of the gNB up to the UPF (e.g., external gateway to the Internet). In another embodiment, the response time includes UP payload delays supplemented with CP processing delays experienced in the gNB. For example, these two delays can be indicated as separate values or can be individually weighted to produce a single composite value indicated to UEs.

In some embodiments, RAN nodes broadcast their current system response time value(s) in order to ensure:
higher reliability in meeting the targeted UE and application latency requirements and thus better working application and services; and/or
more even load in the RAN as the method effectively introduces a load balancing mechanism.

Certain embodiments may provide one or more of the following technical advantage(s):
higher reliability in meeting the targeted application latency requirements configured for a service supported by a UE and thereby help to ensure that applications and services experience the expected/contracted QoS; and/or
more even UP and CP load distribution among the RANs associated with cells to which reselection can be performed as the method effectively introduces a load balancing mechanism.

Figure 2:
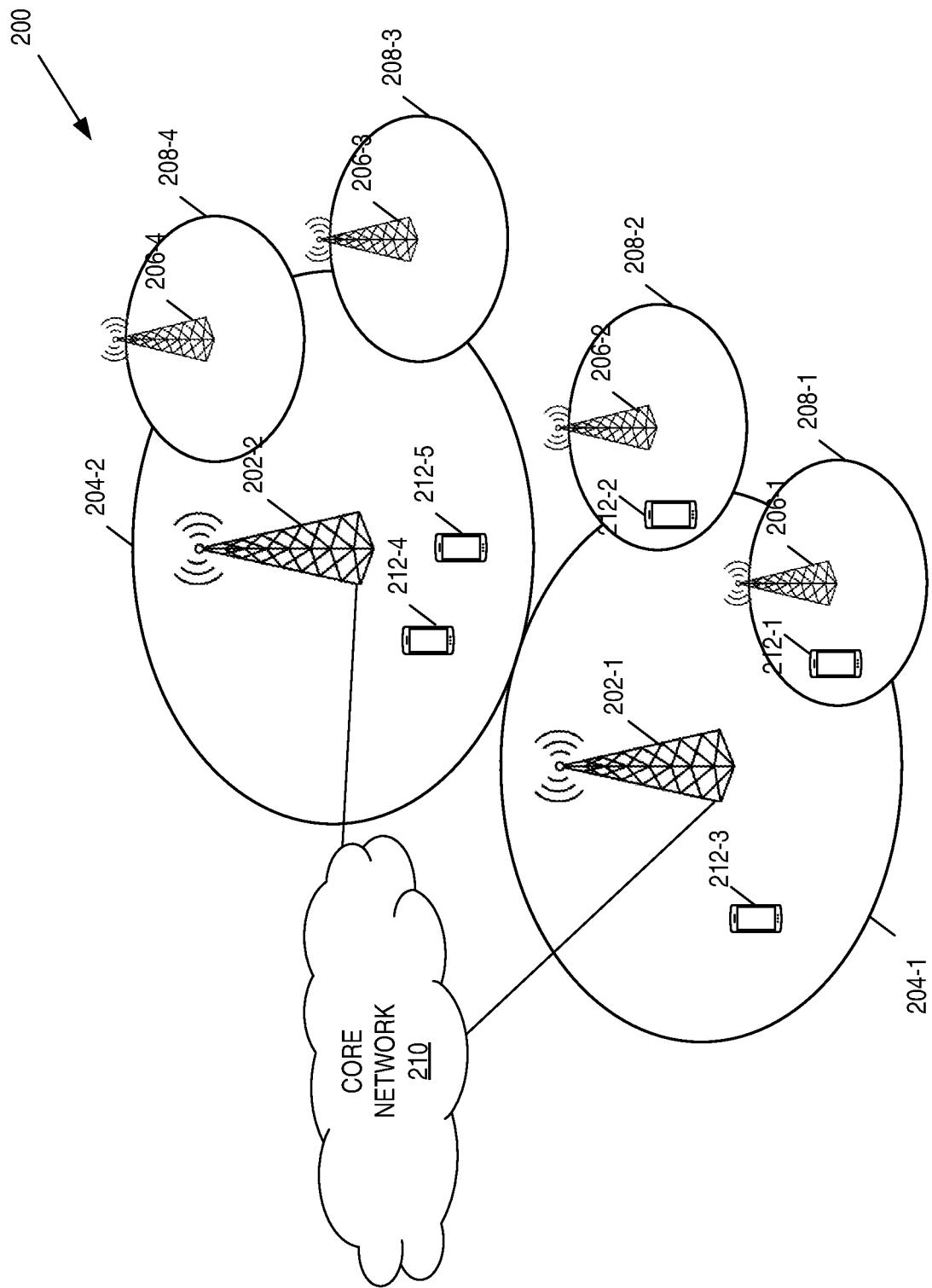
FIG. 2 illustrates one example of a cellular communications system in which embodiments of the present disclosure may be implemented.

FIG. 2 illustrates one example of a cellular communications system 200 in which embodiments of the present disclosure may be implemented. In the embodiments described herein, the cellular communications system 200 is a 5GS including a NR RAN. In this example, the RAN includes base stations 202-1 and 202-2, which in 5G NR are referred to as gNBs, controlling corresponding (macro) cells 204-1 and 204-2. The base stations 202-1 and 202-2 are generally referred to herein collectively as base stations 202 and individually as base station 202. Likewise, the (macro) cells 204-1 and 204-2 are generally referred to herein collectively as (macro) cells 204 and individually as macro cell 204. In some embodiments, the base stations 202 are gNBs having the split-gNB architecture described above with respect to FIG. 1. The RAN may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The cellular communications system 200 also includes a core network 210, which in the 5GS is referred to as the 5G Core (5GC). The base stations 202 (and optionally the low power nodes 206) are connected to the core network 210.

The base stations 202 and the low power nodes 206 provide service to wireless devices 212-1 through 212-5 in the corresponding cells 204 and 208. The wireless devices 212-1 through 212-5 are generally referred to herein collectively as wireless devices 212 and individually as wireless device 212. The wireless devices 212 are also sometimes referred to herein as UEs.

Figure 3:
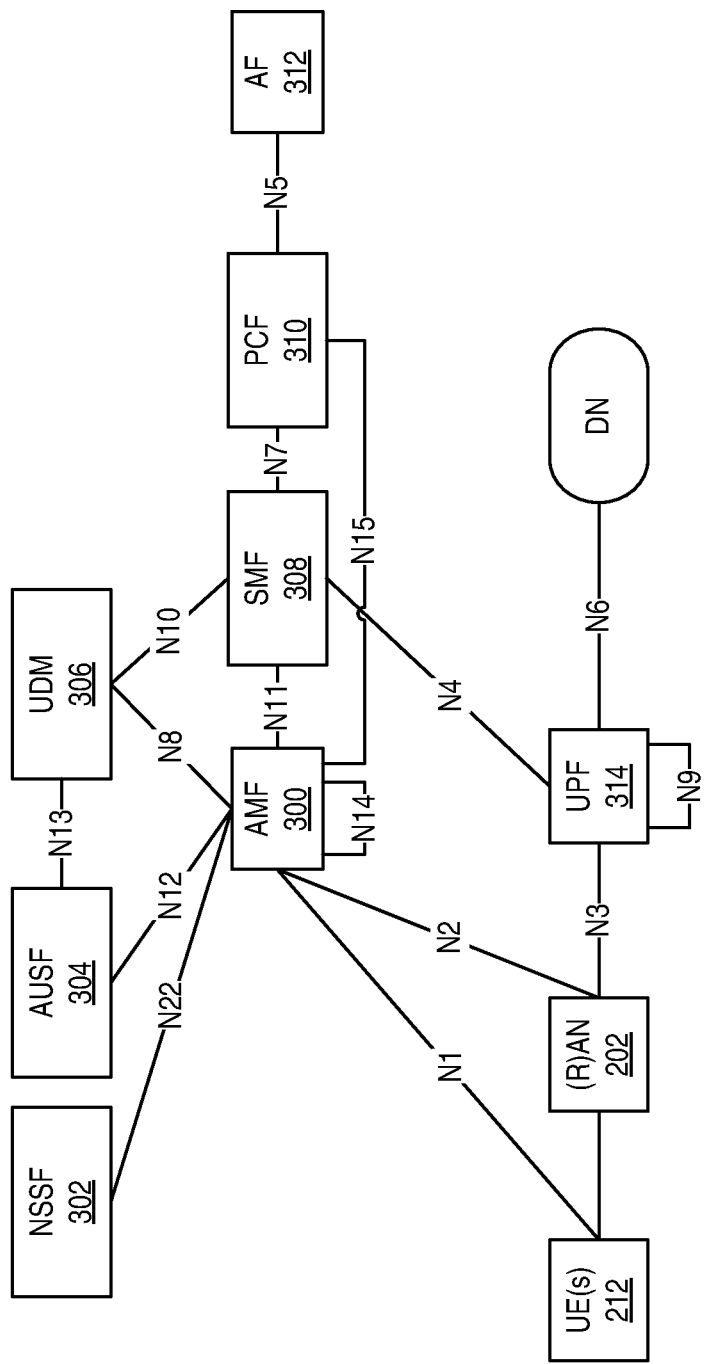
FIGS. 3 and 4 illustrate representations of an example embodiment of the cellular communications system of FIG. 2 in which the cellular communication system is a Fifth Generation (5G) System (5GS)

FIG. 3 illustrates a wireless communication system represented as a 5G network architecture composed of core Network Functions (NFs), where interaction between any two NFs is represented by a point-to-point reference point/interface. FIG. 3 can be viewed as one particular implementation of the system 200 of FIG. 2.

Seen from the access side the 5G network architecture shown in FIG. 3 comprises a plurality of UEs 212 connected to either a RAN 202 or an Access Network (AN) as well as an AMF 300. Typically, the R(AN) 202 comprises base stations, e.g. such as eNBs or gNBs or similar. Seen from the core network side, the 5GC NFs shown in FIG. 3 include a NSSF 302, an AUSF 304, a UDM 306, the AMF 300, a SMF 308, a PCF 310, and an Application Function (AF) 312.

Reference point representations of the 5G network architecture are used to develop detailed call flows in the normative standardization. The N1 reference point is defined to carry signaling between the UE 212 and AMF 300. The reference points for connecting between the AN 202 and AMF 300 and between the AN 202 and UPF 314 are defined as N2 and N3, respectively. There is a reference point, N11, between the AMF 300 and SMF 308, which implies that the SMF 308 is at least partly controlled by the AMF 300. N4 is used by the SMF 308 and UPF 314 so that the UPF 314 can be set using the control signal generated by the SMF 308, and the UPF 314 can report its state to the SMF 308. N9 is the reference point for the connection between different UPFs 314, and N14 is the reference point connecting between different AMFs 300, respectively. N15 and N7 are defined since the PCF 310 applies policy to the AMF 300 and SMF 308, respectively. N12 is required for the AMF 300 to perform authentication of the UE 212. N8 and N10 are defined because the subscription data of the UE 212 is required for the AMF 300 and SMF 308.

The 5GC network aims at separating UP and CP. The UP carries user traffic while the CP carries signaling in the network. In FIG. 3, the UPF 314 is in the UP and all other NFs, i.e., the AMF 300, SMF 308, PCF 310, AF 312, NSSF 302, AUSF 304, and UDM 306, are in the CP. Separating the UP and CP guarantees each plane resource to be scaled independently. It also allows UPFs to be deployed separately from CP functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF 300 and SMF 308 are independent functions in the CP. Separated AMF 300 and SMF 308 allow independent evolution and scaling. Other CP functions like the PCF 310 and AUSF 304 can be separated as shown in FIG. 3. Modularized function design enables the 5GC network to support various services flexibly.

Each NF interacts with another NF directly. It is possible to use intermediate functions to route messages from one NF to another NF. In the CP, a set of interactions between two NFs is defined as service so that its reuse is possible. This service enables support for modularity. The UP supports interactions such as forwarding operations between different UPFs.

Figure 4:
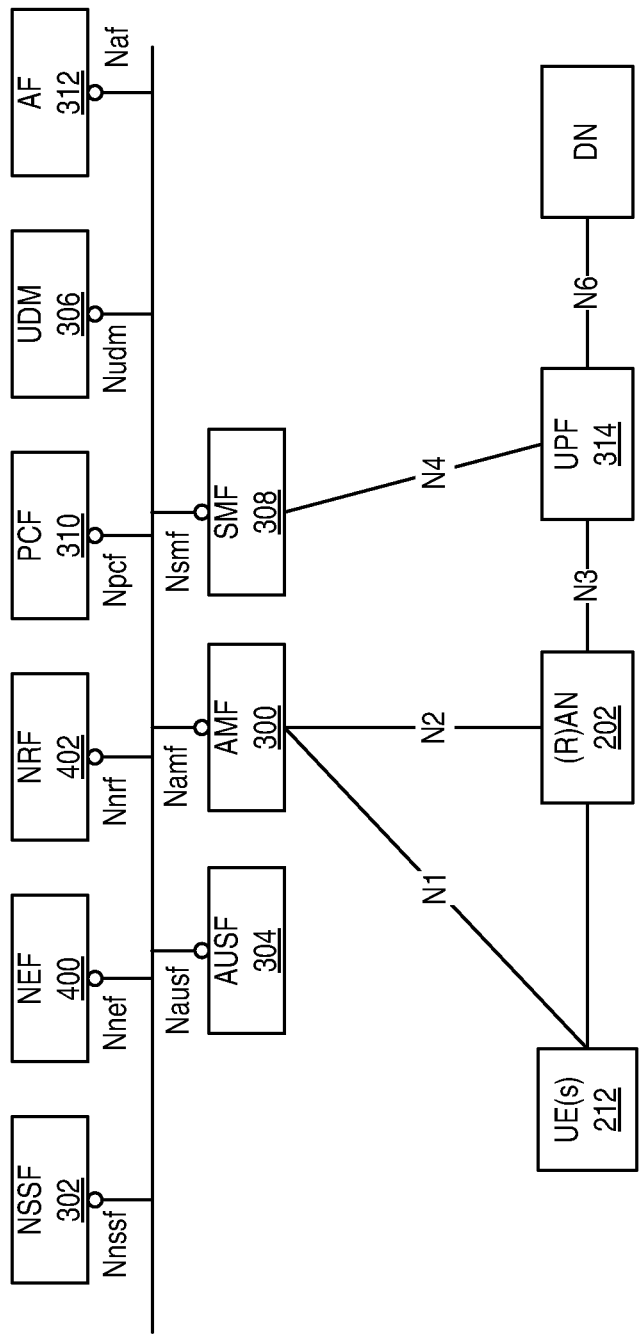

FIG. 4 illustrates a 5G network architecture using service-based interfaces between the NFs in the CP, instead of the point-to-point reference points/interfaces used in the 5G network architecture of FIG. 3. However, the NFs described above with reference to FIG. 3 correspond to the NFs shown in FIG. 4. The service(s) etc. that a NF provides to other authorized NFs can be exposed to the authorized NFs through the service-based interface. In FIG. 4 the service based interfaces are indicated by the letter "N" followed by the name of the NF, e.g. Namf for the service based interface of the AMF 300 and Nsmf for the service based interface of the SMF 308, etc. The NEF 400 and the NRF 402 in FIG. 4 are not shown in FIG. 3 discussed above. However, it should be clarified that all NFs depicted in FIG. 3 can interact with the NEF 400 and the NRF 402 of FIG. 4 as necessary, though not explicitly indicated in FIG. 3.

Some properties of the NFs shown in FIGS. 3 and 4 may be described in the following manner. The AMF 300 provides UE-based authentication, authorization, mobility management, etc. A UE 212 even using multiple access technologies is basically connected to a single AMF 300 because the AMF 300 is independent of the access technologies. The SMF 308 is responsible for session management and allocates Internet Protocol (IP) addresses to UEs. It also selects and controls the UPF 314 for data transfer. If a UE 212 has multiple sessions, different SMFs 308 may be allocated to each session to manage them individually and possibly provide different functionalities per session. The AF 312 provides information on the packet flow to the PCF 310 responsible for policy control in order to support QoS. Based on the information, the PCF 310 determines policies about mobility and session management to make the AMF 300 and SMF 308 operate properly. The AUSF 304 supports authentication function for UEs or similar and thus stores data for authentication of UEs or similar while the UDM 306 stores subscription data of the UE 212. The Data Network (DN), not part of the 5GC network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Embodiments of the present disclosure introduce a modification to the cell reselection process wherein the RAN nodes (e.g., base stations 202) broadcast their respective response times as values reflecting the respective current RAN node processing load (e.g., response time is the delay imposed on UP payload as it migrates through the RAN node associated with a cell under evaluation for suitability) and wherein the UEs take these response times into account in the cell reselection process. In the description below, the RAN node is, at least in some cases, a gNB, specifically a gNB using a split RAN architecture; however, the RAN node is not limited thereto.

In a first embodiment, a method performed by a RAN node includes the RAN node broadcasting a (estimated) response time for that RAN node (and potentially one or more other RAN nodes such as, e.g., one or more neighboring RAN nodes). In some other embodiments, a method performed by a UE includes the UE receiving the broadcasted response time(s) for one or more RAN nodes (e.g., a RAN node for a serving cell or beam of the UE and one or more additional RAN nodes (e.g., one or more RAN nodes for one or more neighboring cells or beams of the UE)), and the UE taking the broadcasted response time(s) into account in a cell reselection process (e.g., the UE performing a cell reselection process that takes into account the broadcasted response time(s) from the RAN node(s) received by the UE). Note that while the embodiments disclosed herein focus on cell reselection, the embodiments are equally applicable to beam (re)selection. In some embodiments, the method performed by the UE is only applicable in RRC_IDLE mode. In some other embodiments, the method performed by the UE is only applicable in RRC_INACTIVE mode. In some other embodiments, the method performed by the UE is applicable in both RRC_IDLE and RRC_INACTIVE mode, see 3GPP Technical Specification (TS) 38.300 V15.5.0. In other words, the method performed by the UE may be performed by a UE in an idle mode (e.g., RRC_IDLE), by a UE in an inactive mode (e.g., RRC_INACTIVE), or by a UE both when the UE is an idle mode (e.g., RRC_IDLE) and when the UE is in an inactive mode (e.g., RRC_INACTIVE).

In some embodiments, the estimated response time for a cell (Cell A) is broadcasted (e.g., in a System Information Block (SIB) message) by Cell A for Cell A itself. In other words, the estimated response time for Cell A is broadcasted (e.g., in a SIB message) by Cell A for Cell A and, likewise, the estimated response times for other cells (e.g., surrounding cells) are broadcasted (e.g., in respective SIB messages) for the respective cells (Cell B, Cell C, etc.) by the respective cells (Cell B, Cell C, etc.). In some other embodiments, estimated response times for both Cell A and for a number of surrounding cells Cell B, Cell C, etc. are broadcasted (e.g., in a SIB message) by Cell A.

In some embodiments, different response time values are broadcasted for DL and UL.

In some embodiments, the method performed by the RAN node and/or the method performed by the UE are/is only applicable to intra-frequency cell reselection. In some other embodiments, the method performed by the RAN node and/or the method performed by the UE are/is only applicable to inter-frequency cell reselection. In some other embodiments, the method performed by the RAN node and/or the method performed by the UE are/is applicable to both intra-frequency and inter-frequency cell reselection.

In some other embodiments, the RAN node also provides the UEs with a radio link quality difference threshold applicable between the cell a UE has ranked as the best candidate cell identified during the cell reselection process and other candidate cells, where this threshold is to be used in selecting candidate cells for the cell reselection process. In some embodiments, the RAN node provides the UE with radio link quality difference threshold in any system information messages, existing or new. In some other embodiments, the UE is provided with the radio link quality difference threshold in a dedicated RRC message.

In some embodiments, the radio quality quantity used by a UE when comparing candidate cells is RSRP. In some other embodiments, the radio quality quantity used when comparing candidate cells is Reference Signal Received Quality (RSRQ). In some other embodiments, the radio quality quantity used when comparing candidate cells is Signal to Interference plus Noise Ratio (SINR).

As an example, assume that a UE is evaluating four cells in the reselection process: Cell 1, Cell 2, Cell 3, and Cell 4. Here, RSRP is used as indication of radio link quality, and "RS" is the indicated response time. The RSRP difference threshold to be used when ranking cells with different response times is set to 2 decibel-milliwatts (dBm). Note also that other offsets (such as $Q_{Hyst}$ and Qoffset) to be used when ranking cells are ignored in the example in order to simplify the comparison/illustration; however, the present disclosure is not limited thereto.

Serving Cell: $RSRP_s$: −103 dBm, Response time $RS_s$: 0.4 milliseconds (ms)
    Cell 1: $RSRP_1$: −100 dBm, Response time $RS_1$: 0.4 ms
    Cell 2: $RSRP_2$: −94 dBm, $RS_2$: 0.4 ms
    Cell 3: $RSRP_3$: −95 dBm, $RS_3$: 0.2 ms
    Cell 4 $RSRP_4$: −97 dBm, $RS_4$: 0.1 ms In this example, all of the neighbor cells are better than the serving cell when it comes to radio link quality. The best cell from a radio link quality perspective is Cell 2, and without taking the response time into account the UE would reselect to this cell (Cell 2).

Taking only the response time into account, the UE would select Cell 4, as this is the best cell from this perspective. However, choosing cells just from the response time perspective may lead to increased interference in the network. Here, the difference threshold compared to the best cell (Cell 2) is set to 2 dBm, which means that Cell 3 is still within this difference threshold as $RSRP_2-RSRP_3=1$ dBm, Cell 4 is outside this difference threshold as $RSRP_2-RSRP_4=3$ dBm, and Cell 1 is outside this difference threshold as $RSRP_2-RSRP_1=6$ dBm. This leaves two candidate cells to be used in the cell ranking, Cell 2 and Cell 3. As Cell 3 then has a lower response time, the UE would reselect to this cell (Cell 3).

In yet some further embodiments, the response time is indicted on the beam level. For example, different response times may be indicated for different beams in the same cell, in which case the UE may take the response time(s) for the detected beams into account when performing cell reselection and/or beam (re)selection. In some other embodiments, the response time is indicated per network slice. Thus, there may be different indicated response time values for different network slices for the same cell, in which case the UE may take the response time for the desired or appropriate network slice into account for cell reselection. In some other embodiments, the response time is indicated per QoS indicator (e.g., per 5G QoS Indicator (5QI)). For example, different response time values may be indicated for different QoS indictor values, in which case the UE may take the response time value for the desired or appropriate QoS indicator value into account for cell reselection. In yet in some other embodiments, the response time is indicated per Public Land Mobile Network (PLMN). For example, a particular cell may be part of more than one PLMN, in which case a separate response time value may be indicated for the cell for each PLMN. As another example, a response time value may be indicated for a PLMN, where this response time is applicable to all cells in that PLMN. Thus, based on the discussion above, multiple response time values may be indicated. As an example, a particular cell may support PLMN 1 and PLMN 2, Network Slice 1 and Network Slice 2, and three beams, in which case there could potentially be 12 response time values indicated for that cell.

In some other embodiments, the F1 application protocol is enhanced such that the DUs report load to the CU and the CU in turn is responsible for setting the overall response time to be either broadcasted or sent to the UEs in a dedicated (e.g., RRC) message.

In some other embodiments, the F1 and E1 application protocols are enhanced to report loads from the CU-UP or the DU to the CU-CP. The CU-CP in turn is responsible for setting the overall response time to be either broadcasted or sent to the UEs in a dedicated (e.g., RRC) message.

In yet some other embodiments, the F1 Application Protocol (F1AP) is enhanced with mechanisms for the CU (or CU-CP in case of split CU) to provide the current response time to the DU.

In yet some further embodiments, the response time also takes delays and loads on interfaces northbound of the gNB (CU or CU-UP) into account, such as across the N3 interface to the UPF, see, e.g., 3GPP TS 23.501 V16.0.2. Here, "northbound" of the gNB means further away from the UE in terms of the network topology of the system (e.g., the UPF is "northbound" of the gNB).

In some embodiments, the indicated response time is with respect to one or more constraints, wherein the one or more constraints can include any one or more of:
    channel quality (i.e., a radio link quality), e.g. RSRP value,
    maximum packet error rate, maximum packet size, and
time occasions, e.g. time occasions where indicated response time is feasible or not feasible.

In one exemplifying embodiment with RSRP value constraint, the indicated response time may be valid if the RSRP value measured at the UE exceeds a certain threshold (e.g., a −100 dBm threshold).

Figure 5:
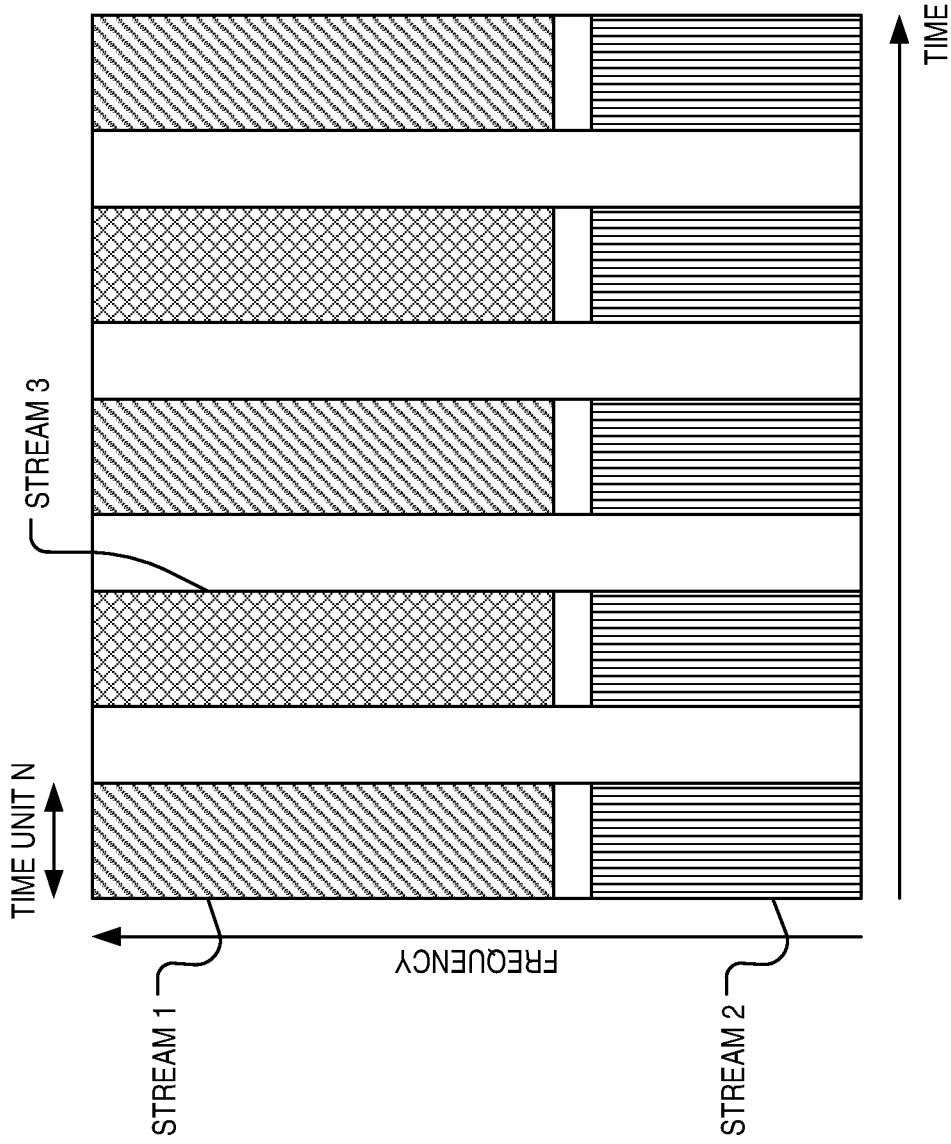
FIG. 5 illustrates an example of time-frequency allocation for a call for traffic streams having different periodicities, time offsets, and packet sizes.

Another exemplifying embodiment with time occasions constraint is wherein a cell is serving several periodic traffic streams for critical traffic. Since the traffic streams can have different periodicity, time offset, and packet sizes, the time-frequency allocation for the cell may look as illustrated in FIG. 5, which is an illustration of time-frequency allocation for two periodic traffic streams. As can be noted, Stream 1 and Stream 3 both have a periodicity of four time units while they have different time offsets, where Stream 3 has a time offset of two time units relative to Stream 1. Further, the frequency allocation for Stream 1 and Stream 3 are equal, which can be due to different packets sizes and/or different radio channel quality. Stream 2 has a periodicity of two time units. FIG. 5 illustrates that, for time units N such that N (mod 2)=0, the time-frequency resources are almost all "booked" by Stream 1, Stream 2, and Stream 3, while for time units N (mod 2)=1 no radio resources are booked. For this exemplifying embodiment, an indicated response time T is feasible in time units such as N (mod 2)=1. A UE receiving the indicated response time and the time occasions where the response time is feasible may deduce if its traffic may be serviced by said cell or not.

In embodiments with time occasion constraints, the time unit may be, e.g., a NR slot, NR sub-slot, or reference to an absolute clock (e.g., Global Positioning System (GPS)). The time reference for the time unit may further be relative a Synchronization Signal Block (SSB) of the cell sending the broadcast message comprising the indicated response time.

In some embodiments, two or more response times each with respective zero or more constraints is indicated.

Figure 6:
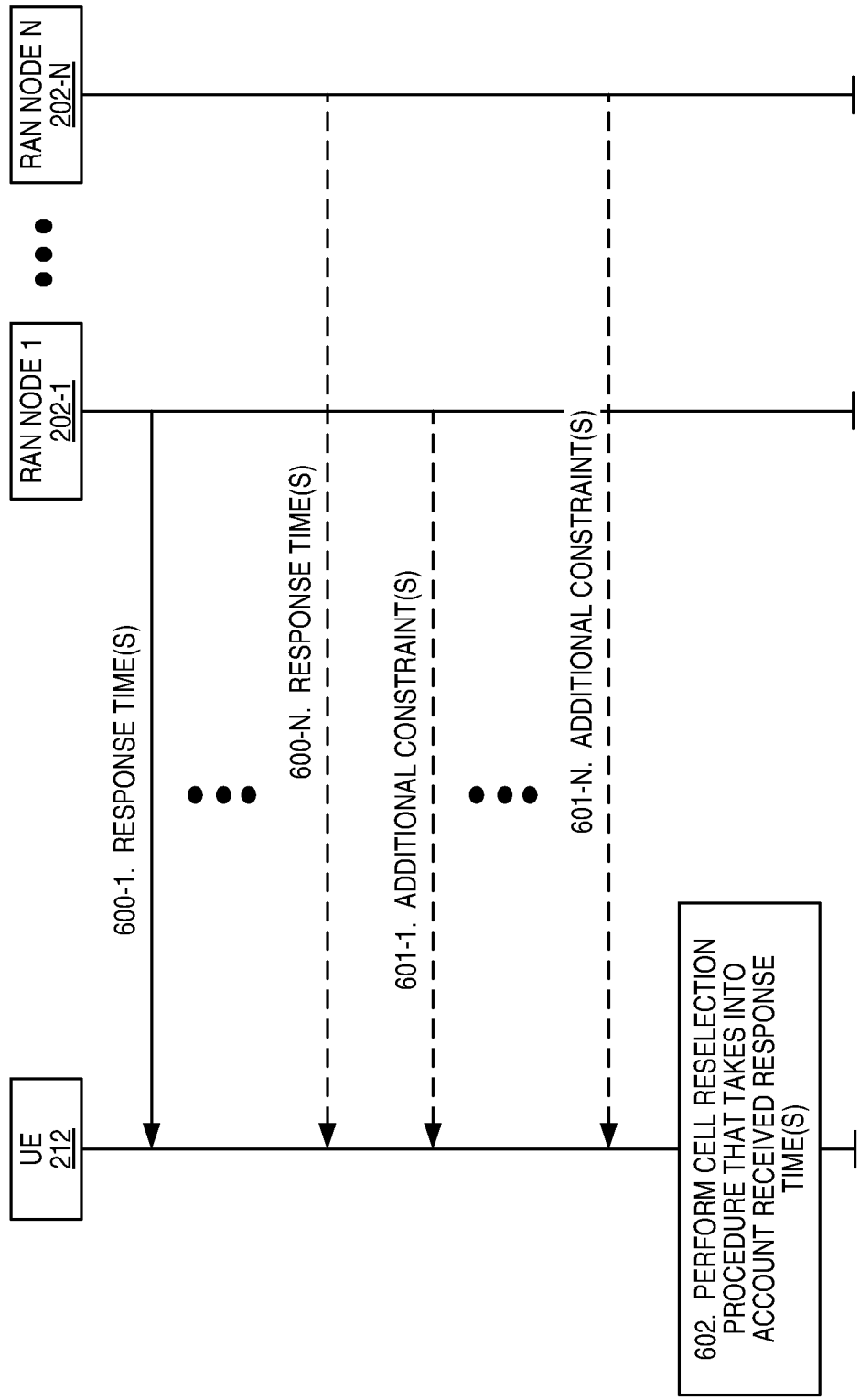
FIG. 6 illustrates the operation of a radio access node(s) and a User Equipment (UE) to provide cell reselection in accordance with some of the embodiments of the present disclosure.

FIG. 6 illustrates the operation of a RAN node(s), which in this example are base stations 202-1 through 202-N such as, e.g., gNBs, and a UE 212 in accordance with at least some of the embodiments described above. As illustrated, a first RAN node (RAN Node 1) transmits (e.g., broadcasts) one or more response times (step 600-1). As discussed above, in some embodiments, the response time(s) transmitted in step 600-1 include a response time for a cell (Cell 1) provided by RAN Node 1. In addition, in some embodiments, the response time(s) transmitted in step 600-1 may also include one or more additional response times for one or more additional cells (e.g., Cell 2, Cell 3, etc.) provided by RAN Node 1, one or more additional cells (e.g., Cell 2, Cell 3, etc.) provided by another RAN node, or both one or more additional cells (e.g., Cell 2, Cell 3, etc.) provided by RAN Node 1 and one or more additional cells (e.g., Cell 2, Cell 3, etc.) provided by another RAN node. As discussed above, the response times may, for one or more of the RAN nodes, be defined on a beam level, rather than a cell level. In some embodiments, RAN Node 1 may also transmit (e.g., broadcast) one or more additional parameters or constraints related to cell reselection (e.g., channel quality constraint, maximum packet error rate constraint, maximum packet size constraint, time occasions constraint, or the like) (step 601-1).

Optionally, in a similar manner, one or more additional RAN nodes (RAN Node N) may also transmit one or more response times (e.g., step 600-N) and, optionally, one or more additional constraints related to cell reselection (e.g., step 601-N), as described above.

The UE 212 receives the response time(s), and optionally additional constraint(s), from RAN Node 1. In some embodiments, the UE 212 may also receive the response time(s), and optionally additional constraint(s), from at least one other RAN node.

The UE 212 performs a cell reselection procedure that takes into account the received response time(s) and, optionally, the received additional constraint(s) related to cell reselection, as described above (step 602). More specifically, in some embodiments, the UE 212 selects a cell from among a set of one or more cells detected by the UE 212 taking into consideration the response times received for those cells and then camps on the selected cell.

Figure 7:
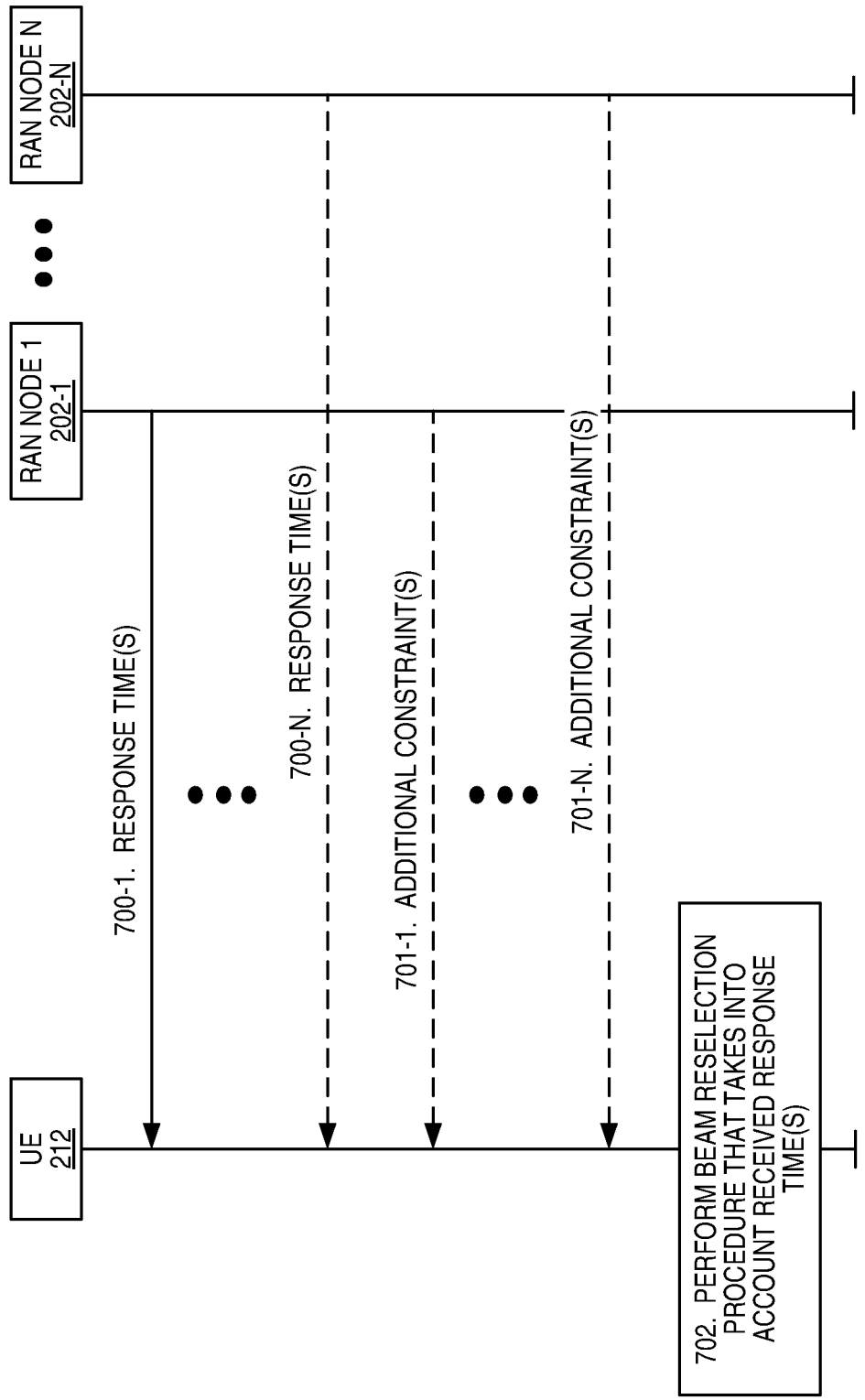
FIG. 7 illustrates the operation of a radio access node(s) and a UE to provide beam reselection in accordance with some of the embodiments of the present disclosure.

FIG. 7 illustrates the operation of a RAN node(s), which is this example are base stations 202-1 through 202-N such as, e.g., gNBs, and a UE 212 in accordance with at least some of the embodiments described above. This procedure is the same as that of FIG. 6 but for beam reselection, rather than cell reselection. As illustrated, a first RAN node (RAN Node 1) transmits (e.g., broadcasts) one or more response times (step 700-1). As discussed above, in some embodiments, the response time(s) transmitted in step 700-1 include a response time for a beam(s) provided by RAN Node 1. In addition, in some embodiments, the response time(s) transmitted in step 700-1 may alternatively include one or more additional response times for one or more additional beams provided by another RAN node, or include both response times for one or more beams provided by RAN Node 1 and one or more additional beams provided by another RAN node. In some embodiments, RAN Node 1 may also transmit (e.g., broadcast) one or more additional parameters or constraints related to beam reselection (e.g., channel quality constraint, maximum packet error rate constraint, maximum packet size constraint, time occasions constraint, or the like) (step 701-1).

Optionally, in a similar manner, one or more additional RAN nodes (RAN Node N) may also transmit one or more response times (e.g., step 700-N) and, optionally, one or more additional constraints related to beam reselection (e.g., step 701-N), as described above.

The UE 212 receives the response time(s), and optionally additional constraint(s), from RAN Node 1. In some embodiments, the UE 212 may also receive the response time(s), and optionally additional constraint(s), from at least one other RAN node.

The UE 212 performs a beam reselection procedure that takes into account the received response time(s) and, optionally, the received additional constraint(s) related to beam reselection, as described above (step 702). More specifically, in some embodiments, the UE 212 selects a beam from among a set of one or more beams detected by the UE 212 taking into consideration the response times received for those beams and then camps on the selected beam.

Figure 8:
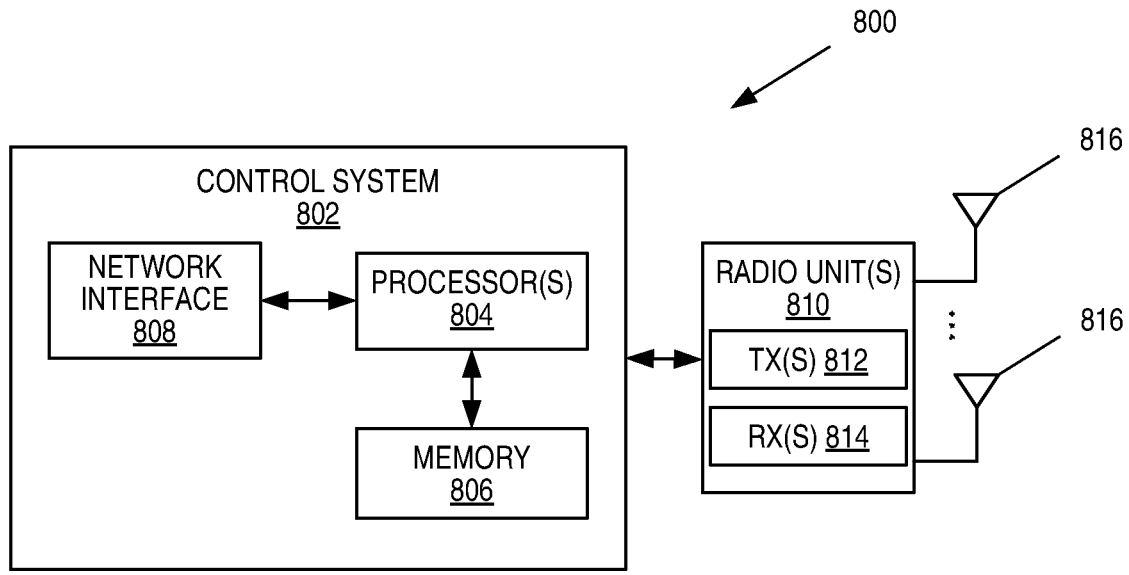
FIGS. 8 through 10 are schematic block diagrams of example embodiments of a radio access node.

FIG. 8 is a schematic block diagram of a radio access node 800 according to some embodiments of the present disclosure. The radio access node 800 may be, for example, a base station 202 or 206 such as, e.g., a gNB. As illustrated, the radio access node 800 includes a control system 802 that includes one or more processors 804 (e.g., Central Processing Units (CPUs), Application Specific Integrated Circuits (ASICs), Field Programmable Gate Arrays (FPGAs), and/or the like), memory 806, and a network interface 808. The one or more processors 804 are also referred to herein as processing circuitry. In addition, the radio access node 800 includes one or more radio units 810 that each includes one or more transmitters 812 and one or more receivers 814 coupled to one or more antennas 816. The radio units 810 may be referred to or be part of radio interface circuitry. In some embodiments, the radio unit(s) 810 is external to the control system 802 and connected to the control system 802 via, e.g., a wired connection (e.g., an optical cable). However, in some other embodiments, the radio unit(s) 810 and potentially the antenna(s) 816 are integrated together with the control system 802. The one or more processors 804 operate to provide one or more functions of a radio access node 800 as described herein (e.g., one or more functions of a RAN node or gNB described herein). In some embodiments, the function(s) are implemented in software that is stored, e.g., in the memory 806 and executed by the one or more processors 804.

Figure 9:
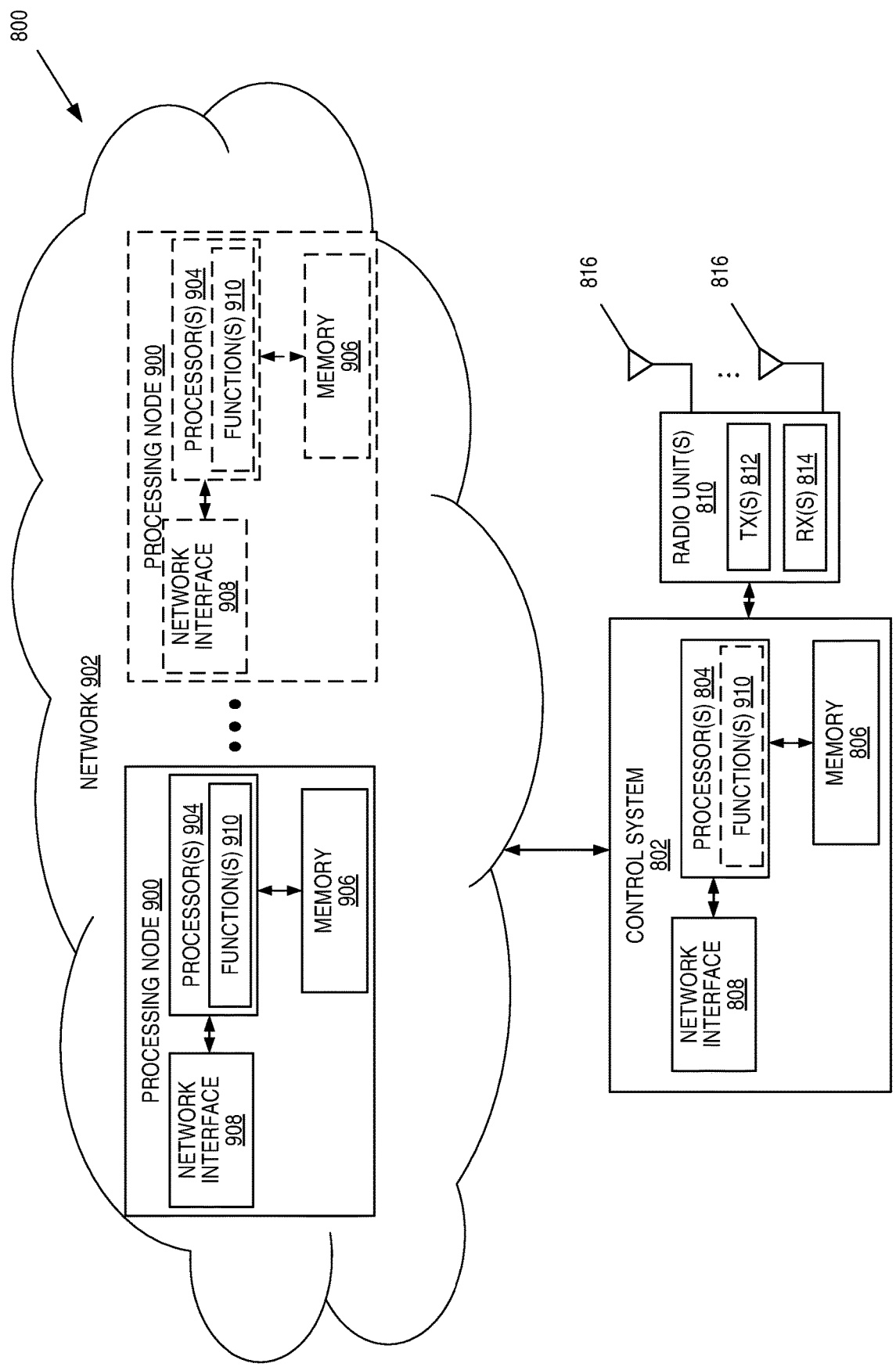

FIG. 9 is a schematic block diagram that illustrates a virtualized embodiment of the radio access node 800 according to some embodiments of the present disclosure. This discussion is equally applicable to other types of network nodes. Further, other types of network nodes may have similar virtualized architectures.

As used herein, a "virtualized" radio access node is an implementation of the radio access node 800 in which at least a portion of the functionality of the radio access node 800 is implemented as a virtual component(s) (e.g., via a virtual machine(s) executing on a physical processing node(s) in a network(s)). As illustrated, in this example, the radio access node 800 includes the control system 802 that includes the one or more processors 804 (e.g., CPUs, ASICs, FPGAs, and/or the like), the memory 806, and the network interface 808 and the one or more radio units 810 that each includes the one or more transmitters 812 and the one or more receivers 814 coupled to the one or more antennas 816, as described above. The control system 802 is connected to the radio unit(s) 810 via, for example, an optical cable or the like. The control system 802 is connected to one or more processing nodes 900 coupled to or included as part of a network(s) 902 via the network interface 808. Each processing node 900 includes one or more processors 904 (e.g., CPUs, ASICs, FPGAs, and/or the like), memory 906, and a network interface 908.

In this example, functions 910 of the radio access node 800 described herein (e.g., one or more functions of a RAN node or gNB described herein) are implemented at the one or more processing nodes 900 or distributed across the control system 802 and the one or more processing nodes 900 in any desired manner. In some particular embodiments, some or all of the functions 910 of the radio access node 800 described herein are implemented as virtual components executed by one or more virtual machines implemented in a virtual environment(s) hosted by the processing node(s) 900. As will be appreciated by one of ordinary skill in the art, additional signaling or communication between the processing node(s) 900 and the control system 802 is used in order to carry out at least some of the desired functions 910. Notably, in some embodiments, the control system 802 may not be included, in which case the radio unit(s) 810 communicate directly with the processing node(s) 900 via an appropriate network interface(s).

In some embodiments, a computer program including instructions which, when executed by at least one processor, causes the at least one processor to carry out the functionality of radio access node 800 (e.g., one or more functions of a RAN node or gNB described herein) or a node (e.g., a processing node 900) implementing one or more of the functions 910 of the radio access node 800 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
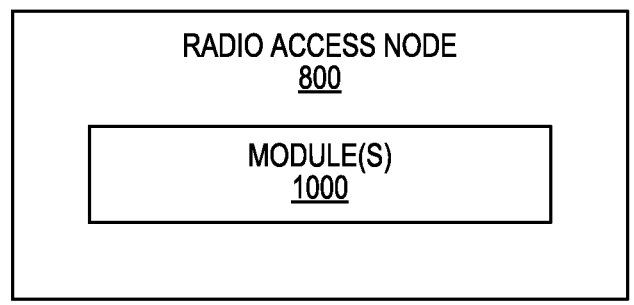

FIG. 10 is a schematic block diagram of the radio access node 800 according to some other embodiments of the present disclosure. The radio access node 800 includes one or more modules 1000, each of which is implemented in software. The module(s) 1000 provide the functionality of the radio access node 800 described herein (e.g., one or more functions of a RAN node or gNB described herein). This discussion is equally applicable to the processing node 900 of FIG. 9 where the modules 1000 may be implemented at one of the processing nodes 900 or distributed across multiple processing nodes 900 and/or distributed across the processing node(s) 900 and the control system 802.

Figure 11:
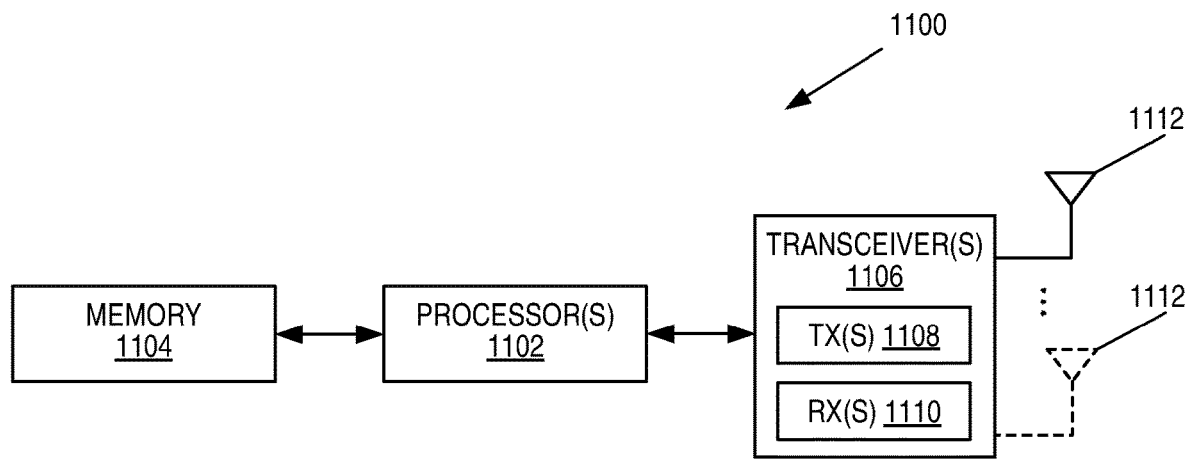
FIGS. 11 and 12 are schematic block diagrams of example embodiments of a UE.

FIG. 11 is a schematic block diagram of a UE 1100 according to some embodiments of the present disclosure. As illustrated, the UE 1100 includes one or more processors 1102 (e.g., CPUs, ASICs, FPGAs, and/or the like), memory 1104, and one or more transceivers 1106 each including one or more transmitters 1108 and one or more receivers 1110 coupled to one or more antennas 1112. The transceiver(s) 1106 includes radio-front end circuitry connected to the antenna(s) 1112 that is configured to condition signals communicated between the antenna(s) 1112 and the processor(s) 1102, as will be appreciated by on of ordinary skill in the art. The processors 1102 are also referred to herein as processing circuitry. The transceivers 1106 are also referred to herein as radio circuitry. In some embodiments, the functionality of the UE 1100 described above (e.g., one or more functions of a UE described herein) may be fully or partially implemented in software that is, e.g., stored in the memory 1104 and executed by the processor(s) 1102. Note that the UE 1100 may include additional components not illustrated in FIG. 11 such as, e.g., one or more user interface components (e.g., an input/output interface including a display, buttons, a touch screen, a microphone, a speaker(s), and/or the like and/or any other components for allowing input of information into the UE 1100 and/or allowing output of information from the UE 1100), a power supply (e.g., a battery and associated power circuitry), etc.

In some embodiments, a computer program including instructions which, when executed by at least one processor, causes the at least one processor to carry out the functionality of the UE 1100 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
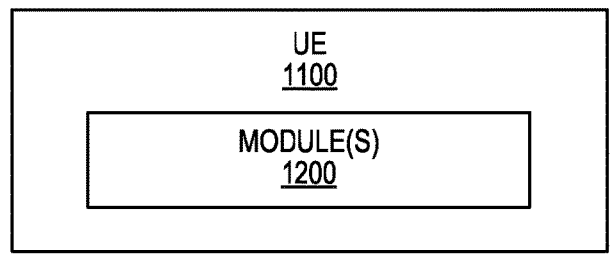

FIG. 12 is a schematic block diagram of the UE 1100 according to some other embodiments of the present disclosure. The UE 1100 includes one or more modules 1200, each of which is implemented in software. The module(s) 1200 provide the functionality of the UE 1100 described herein (e.g., one or more functions of a UE described herein).

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like.

The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows.

Embodiment 1: A method performed by a User Equipment, UE, for cell reselection in a cellular communications system, the method comprising: receiving (600-1, 600-N) response times from one or more Radio Access Network, RAN, nodes; and performing (602) a cell reselection procedure that takes into consideration the response times received from the one or more RAN nodes.

Embodiment 2: The method of embodiment 1 wherein each of the response times reflect a current processing load of a respective one of the one or more RAN nodes.

Embodiment 3: The method of embodiment 1 wherein each of the response times reflect a current processing load of a respective one of the one or more RAN nodes with respect to a respective cell under evaluation by the cell reselection procedure.

Embodiment 4: The method of any one of embodiments 1 to 3 wherein: the response times comprise two or more response times for two or more respective cells detected by the UE; and performing (602) the cell reselection procedure comprises selecting one of the two or more cells based on the response times for the two or more cells.

Embodiment 5: The method of any one of embodiments 1 to 4 wherein the response times comprise different response times for uplink and downlink.

Embodiment 6: The method of any one of embodiments 1 to 5 wherein receiving (600-1, 600-N) the response times comprises receiving (600-1, 600-N) the response times via one or more broadcast messages (e.g., one or more system information messages).

Embodiment 7: The method of any one of embodiments 1 to 5 wherein receiving (600-1, 600-N) the response times comprises receiving (600-1, 600-N) the response times via dedicated signaling.

Embodiment 8: The method of any one of embodiments 1 to 7 wherein the UE is in an idle mode.

Embodiment 9: The method of any one of embodiments 1 to 7 wherein the UE is in an inactive mode.

Embodiment 10: The method of any one of embodiments 1 to 9 wherein the cell reselection procedure is an intra-frequency cell reselection procedure.

Embodiment 11: The method of any one of embodiments 1 to 9 wherein the cell reselection procedure is an inter-frequency cell reselection procedure.

Embodiment 12: The method of any one of embodiments 1 to 11 further comprising: receiving, from the one or more RAN nodes, one or more cell reselection constraints; wherein the cell reselection procedure takes into consideration the response times and the one or more cell reselection constraints.

Embodiment 13: The method of embodiment 12 wherein the one or more cell reselection constraints comprise: a radio link quality threshold difference with respect to a radio link quality of a defined reference cell (e.g., a best ranked cell from among cells detected by the UE based on radio link quality).

Embodiment 14: The method of embodiment 12 or 13 wherein the one or more cell reselection constraints comprise: a channel quality constraint; a maximum packet error rate constraint; a maximum packet size constraint; and/or a time occasions related constraint.

Embodiment 15: The method of any one of embodiments 1 to 14 wherein at least one of the response times is indicated on a cell level.

Embodiment 16: The method of any one of embodiments 1 to 14 wherein at least one of the response times is indicated on a beam level.

Embodiment 17: The method of any one of embodiments 1 to 14 wherein at least one of the response times is indicated on a network slice level.

Embodiment 18: The method of any one of embodiments 1 to 14 wherein at least one of the response times is indicated on a Quality of Service, QoS, indicator level.

Embodiment 19: The method of any one of embodiments 1 to 14 wherein at least one of the response times is indicated on a Public Land Mobile Network, PLMN, level.

Embodiment 20: The method of any one of embodiments 1 to 19 wherein the response times take into account delays and loads on interfaces northbound (in terms of network topology) from the one or more RAN nodes (e.g., on interface between a RAN node and a User Plane Function, UPF).

Embodiment 21: A User Equipment, UE, for cell reselection in a cellular communications system, the UE adapted to perform the method of any one of embodiments 1 to 20.

Embodiment 22: The UE of embodiment 21 wherein the UE comprises: one or more receivers; and processing circuitry associated with the one or more receivers, the processing circuitry configured to cause the UE to perform the method of any one of embodiments 1 to 20.

Embodiment 23: A method performed by a Radio Access Network, RAN, node in a cellular communications system, the method comprising transmitting (600-1) one or more response times associated with the RAN node and/or one or more cells served by the RAN node.

Embodiment 24: The method of embodiment 23 wherein each of the one or more response times reflect a current processing load of the RAN node.

Embodiment 25: The method of embodiment 23 wherein each of the one or more response times reflect a current processing load of the RAN node with respect to a respective cell served by the RAN node.

Embodiment 26: The method of any one of embodiments 23 to 25 wherein the one or more response times comprise two or more response times for two or more respective cells served by the RAN node.

Embodiment 27: The method of any one of embodiments 23 to 26 wherein the one or more response times comprise different response times for uplink and downlink.

Embodiment 28: The method of any one of embodiments 23 to 27 wherein transmitting (600-1) the one or more response times comprises transmitting (600-1) the one or more response times via one or more broadcast messages (e.g., one or more system information messages).

Embodiment 29: The method of any one of embodiments 23 to 27 wherein transmitting (600-1) the one or more response times comprises transmitting (600-1) the one or more response times to a User Equipment, UE, via dedicated signaling.

Embodiment 30: The method of any one of embodiments 23 to 29 wherein the one or more response times are applicable to UE idle mode cell reselection.

Embodiment 31: The method of any one of embodiments 23 to 29 wherein the one or more response times are applicable to UE inactive mode cell reselection.

Embodiment 32: The method of any one of embodiments 23 to 31 wherein the one or more response times are applicable to intra-frequency cell reselection.

Embodiment 33: The method of any one of embodiments 23 to 31 wherein the one or more response times are applicable to inter-frequency cell reselection.

Embodiment 34: The method of any one of embodiments 23 to 33 further comprising transmitting one or more cell reselection constraints.

Embodiment 35: The method of embodiment 34 wherein the one or more cell reselection constraints comprise a radio link quality threshold difference with respect to a radio link quality of a defined reference cell (e.g., a best ranked cell from among cells detected by the UE based on radio link quality).

Embodiment 36: The method of embodiment 34 or 35 wherein the one or more cell reselection constraints comprise: a channel quality constraint; a maximum packet error rate constraint; a maximum packet size constraint; and/or a time occasions related constraint.

Embodiment 37: The method of any one of embodiments 23 to 26 wherein at least one of the one or more response times is indicated on a cell level.

Embodiment 38: The method of any one of embodiments 23 to 26 wherein at least one of the one or more response times is indicated on a beam level.

Embodiment 39: The method of any one of embodiments 23 to 26 wherein at least one of the one or more response times is indicated on a network slice level.

Embodiment 40: The method of any one of embodiments 23 to 26 wherein at least one of the one or more response times is indicated on a Quality of Service, QoS, indicator level.

Embodiment 41: The method of any one of embodiments 23 to 26 wherein at least one of the one or more response times is indicated on a Public Land Mobile Network, PLMN, level.

Embodiment 42: The method of any one of embodiments 23 to 41 wherein the one or more response times take into account delays and loads on interfaces northbound (in terms of network topology) from the RAN node (e.g., on an interface between the RAN node and a User Plane Function, UPF).

Embodiment 43: The method of any one of embodiments 23 to 42 wherein the RAN node comprises one or more Distributed Units, DUs, and a Central Unit, CU.

Embodiment 44: The method of embodiment 43 wherein the one or more DUs report load to the CU, wherein the CU determines the one or more response times based on the reported loads from the one or more DUs.

Embodiment 45: The method of any one of embodiments 23 to 42 wherein the RAN node comprises one or more Distributed Units, DUs, and a Central Unit Control Plane, CU-CP.

Embodiment 46: The method of embodiment 45 wherein the one or more DUs report load to the CU-CP, wherein the CU-CP determines the one or more response times based on the reported loads from the one or more DUs.

Embodiment 47: A Radio Access Network, RAN, node in a cellular communications system, the RAN node adapted to perform the method of any one of embodiments 23 to 46.

Embodiment 48: The RAN node of embodiment 47 wherein the RAN node comprises: a network interface; and processing circuitry associated with the network interface, the processing circuitry configured to cause the RAN node to perform the method of any one of embodiments 23 to 46.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
5QI Fifth Generation Quality of Service Indicator
AF Application Function
AMF Access and Mobility Management Function
AN Access Network
ASIC Application Specific Integrated Circuit
AUSF Authentication Server Function
CP Control Plane
CPU Central Processing Unit
CU Central Unit
dBm Decibel-Milliwatt
DL Downlink
DN Data Network
DSP Digital Signal Processor
DU Distributed Unit
E1AP E1 Application Protocol
eNB Enhanced or Evolved Node B
F1AP F1 Application Protocol
FPGA Field Programmable Gate Array
GF Grant-Free
gNB New Radio Base Station
GPS Global Positioning System
GSM Global System for Mobile Communications
HSS Home Subscriber Server
IP Internet Protocol
LTE Long Term Evolution
MME Mobility Management Entity
ms Millisecond
MTC Machine Type Communication
NEF Network Exposure Function
NF Network Function
NR New Radio
NRF Network Repository Function
NSSF Network Slice Selection Function
PCF Policy Control Function
PDB Packet Delay Budget
P-GW Packet Data Network Gateway
PLMN Public Land Mobile Network
QoS Quality of Service
RAM Random Access Memory
RAN Radio Access Network
RAR Random Access Response
RAT Radio Access Technology
ROM Read Only Memory
RRC Radio Resource Control
RRH Remote Radio Head
RSRP Reference Signal Received Power
RSRQ Reference Signal Received Quality
RTT Round Trip Time SCEF Service Capability Exposure Function
SIB System Information Block
SINR Signal to Interference plus Noise Ratio
SMF Session Management Function
SR Scheduling Request
SSB Synchronization Signal Block
TS Technical Specification
TTI Transmission Time Interval
UDM Unified Data Management
UE User Equipment
UL Uplink
UP User Plane
UPF User Plane Function
URLLC Ultra-Reliable and Low Latency Communication
WG Work Group Those skilled in the art will recognize improvements and modifications to the embodiments of the present disclosure. All such improvements and modifications are considered within the scope of the concepts disclosed herein.

What is claimed is:

1. A method performed by a User Equipment, UE, for cell or beam selection or reselection for a cellular communications system, the method comprising:
   receiving response times from one or more Radio Access Network, RAN, nodes via one or more broadcast messages; and
   performing a cell or beam selection or reselection procedure that takes into consideration the response times received from the one or more RAN nodes;
   wherein the response times take into account delays and loads on interfaces northbound, in terms of network topology, from the one or more RAN nodes.

2. The method of claim 1 wherein each of the response times reflect a current processing load of a respective one of the one or more RAN nodes.

3. The method of claim 1 wherein each of the response times reflect a current processing load of a respective one of the one or more RAN nodes that corresponds to a respective cell or beam under evaluation by the cell or beam selection or reselection procedure.

4. The method of claim 1 wherein:
   the response times comprise two or more response times for two or more respective cells or beams detected by the UE; and
   performing the cell or beam selection or reselection procedure comprises selecting one of the two or more respective cells or beams based on the two or more response times for the two or more respective cells or beams.

5. The method of claim 1 wherein the two or more response times comprise different response times for uplink and downlink.

6. The method of claim 1 wherein the cell or beam selection or reselection procedure is an intra-frequency cell or beam selection or reselection procedure.

7. The method of claim 1 wherein the cell or beam selection or reselection procedure is an inter-frequency cell or beam selection or reselection procedure.

8. The method of claim 1 further comprising:
   receiving, from the one or more RAN nodes, one or more cell or beam selection or reselection constraints;
   wherein the cell or beam selection or reselection procedure takes into consideration the response times and the one or more cell or beam selection or reselection constraints.

9. A User Equipment, UE, for cell or beam selection or reselection for a cellular communications system, the UE comprising:
   one or more receivers; and
   processing circuitry associated with the one or more receivers, the processing circuitry configured to cause the UE to:
   receive response times from one or more Radio Access Network, RAN, nodes via one or more broadcast messages; and
   perform a cell or beam selection or reselection procedure that takes into consideration the response times received from the one or more RAN nodes;
   wherein the response times take into account delays and loads on interfaces northbound, in terms of network topology, from the one or more RAN nodes.

10. A method performed by a Radio Access Network, RAN, node in a cellular communications system, the method comprising:
    transmitting one or more response times associated with the RAN node, one or more cells served by the RAN node, or one or more beams served by the RAN node via one or more broadcast messages;
    wherein the response times take into account delays and loads on interfaces northbound, in terms of network topology, from the RAN node.

11. The method of claim 10 wherein each of the one or more response times reflect a current processing load of the RAN node.

12. The method of claim 10 wherein each of the one or more response times reflect a current processing load of the RAN node that corresponds to a respective cell or beam served by the RAN node.

13. The method of claim 10 wherein:
    the one or more response times comprise two or more response times for two or more respective cells or beams served by the RAN node.

14. The method of claim 10 wherein the one or more response times comprise different response times for uplink and downlink.

15. The method of claim 10 wherein the one or more response times are applicable to intra-frequency cell or beam selection or reselection.

16. The method of claim 10 wherein the one or more response times are applicable to inter-frequency cell or beam selection or reselection.

17. The method of claim 10 further comprising:
    transmitting one or more cell or beam selection or reselection constraints.

18. A Radio Access Network, RAN, node for a cellular communications system, the RAN node comprising:
    a network interface; and
    processing circuitry associated with the network interface, the processing circuitry configured to cause the RAN node to:
    transmit one or more response times associated with the RAN node, one or more cells served by the RAN node, or one or more beams served by the RAN node via one or more broadcast messages;
    wherein the response times take into account delays and loads on interfaces northbound, in terms of network topology, from the RAN node.

* * * * *